(12) United States Patent
Luo et al.

(10) Patent No.: US 12,306,424 B2
(45) Date of Patent: May 20, 2025

(54) METASURFACE-BASED IMAGING SYSTEM, DESIGN METHOD, AND DETECTOR

(71) Applicant: THE INSTITUTE OF OPTICS AND ELECTRONICS, THE CHINESE ACADEMY OF SCIENCES, Sichuan (CN)

(72) Inventors: Xiangang Luo, Chengdu (CN); Fei Zhang, Chengdu (CN); Mingbo Pu, Chengdu (CN); Ting Xie, Chengdu (CN); Xiaoliang Ma, Chengdu (CN)

(73) Assignee: THE INSTITUTE OF OPTICS AND ELECTRONICS, THE CHINESE ACADEMY OF SCIENCES, Chengdu (CN)

( * ) Notice: Subject to any disclaimer, the term of this patent is extended or adjusted under 35 U.S.C. 154(b) by 0 days.

(21) Appl. No.: 18/856,800

(22) PCT Filed: Mar. 30, 2023

(86) PCT No.: PCT/CN2023/085142
§ 371 (c)(1),
(2) Date: Oct. 14, 2024

(87) PCT Pub. No.: WO2023/197884
PCT Pub. Date: Oct. 19, 2023

(65) Prior Publication Data
US 2025/0116801 A1     Apr. 10, 2025

(30) Foreign Application Priority Data
Apr. 15, 2022   (CN) .................. 202210392652.9

(51) Int. Cl.
*G02B 5/20*   (2006.01)
*B82Y 20/00*   (2011.01)
*G02B 1/00*   (2006.01)

(52) U.S. Cl.
CPC .............. *G02B 5/206* (2013.01); *B82Y 20/00* (2013.01); *G02B 1/002* (2013.01)

(58) Field of Classification Search
CPC .......... G02B 5/206; G02B 5/20; G02B 5/203; G02B 5/204; G02B 5/18–1895;
(Continued)

(56) References Cited

U.S. PATENT DOCUMENTS 11,705,472 B2   7/2023   Hsieh et al.
11,978,752 B2   5/2024   Devlin et al.
(Continued)

FOREIGN PATENT DOCUMENTS

CN   105929560 A   9/2016
CN   106932916 A   7/2017
(Continued)

OTHER PUBLICATIONS

Fedotov, V.A. et al., "Wavevector Selective Metasurfaces and Tunnel Vision Filters," Light: Science & Applications, (Feb. 2015).
(Continued)

*Primary Examiner* — Stephone B Allen
*Assistant Examiner* — Adam W Booher
(74) *Attorney, Agent, or Firm* — Maschoff Brennan

(57) ABSTRACT

A metasurface-based imaging system, a design method, and a detector. In an optical axis direction, the metasurface-based imaging system sequentially comprises: a quadratic-phase-based metasurface structure, consisting of a sub-wavelength unit structure array (1) and a substrate (2), the metasurface structure being a monolayer structure and used for implementing preset phase distribution; and a wavevector filter (3), each position of which is equivalent to one aperture stop, the wavevector filter having a filtering function and having different wavevector modulation effects under different incident angles. The metasurface-based (Continued)

imaging system has the advantages of being ultra-light, ultra-thin, and high in imaging quality, and can achieve large-area, ultra-thin, and large field-of-view imaging detection.

10 Claims, 12 Drawing Sheets

(58) Field of Classification Search
CPC ............ G02B 1/002; G02B 2005/1804; G02B 27/0025; G02B 27/0037; G02B 27/005; G02B 27/0056; G02B 27/0944; G02B 27/42–4227; G02B 27/4272; G02B 27/4277; B82Y 20/00
See application file for complete search history.

(56) References Cited

U.S. PATENT DOCUMENTS

| | | |
|---|---|---|
| 2016/0146989 A1 | 5/2016 | Sakat et al. |
| 2016/0334758 A1 | 11/2016 | Shaltout et al. |
| 2019/0064532 A1 | 2/2019 | Riley, Jr. et al. |
| 2019/0113885 A1 | 4/2019 | Arbabi et al. |
| 2020/0025610 A1 | 1/2020 | Chandrasekar et al. |
| 2021/0044748 A1 | 2/2021 | Hu et al. |
| 2021/0048342 A1 | 2/2021 | Kim et al. |
| 2021/0348969 A1 | 11/2021 | Yao et al. |
| 2022/0341782 A1 | 10/2022 | Zhang et al. |
| 2022/0381951 A1 | 12/2022 | Giacomotti et al. |
| 2023/0003979 A1 | 1/2023 | Wang et al. |
| 2023/0194760 A1 | 6/2023 | Hao et al. |
| 2023/0280499 A1 | 9/2023 | Hao et al. |

FOREIGN PATENT DOCUMENTS

| | | |
|---|---|---|
| CN | 109752842 A | 5/2019 |
| CN | 110376665 A | 10/2019 |
| CN | 110794561 A | 2/2020 |
| CN | 111352237 A | 6/2020 |
| CN | 111380612 A | 7/2020 |
| CN | 111624688 A | 9/2020 |
| CN | 111656707 A | 9/2020 |
| CN | 111897137 A | 11/2020 |
| CN | 111948806 A | 11/2020 |
| CN | 112147731 A | 12/2020 |
| CN | 112649365 A | 4/2021 |
| CN | 112909569 A | 6/2021 |
| CN | 112987203 A | 6/2021 |
| CN | 113128475 A | 7/2021 |
| CN | 113686437 A | 11/2021 |
| CN | 113820013 A | 12/2021 |
| CN | 113917578 A | 1/2022 |
| CN | 113946009 A | 1/2022 |
| CN | 114018417 A | 2/2022 |
| CN | 114122732 A | 3/2022 |
| CN | 114217413 A | 3/2022 |
| CN | 114286953 A | 4/2022 |
| CN | 114341674 A | 4/2022 |
| CN | 114488525 A | 5/2022 |
| FR | 3 102 573 A1 | 4/2021 |
| JP | 5577474 B1 | 8/2014 |
| KR | 10-2020-0071586 A | 6/2020 |
| KR | 10-2020-0129034 A | 11/2020 |
| WO | 2019/103762 A2 | 5/2019 |
| WO | 2019/136166 A1 | 7/2019 |
| WO | 2021/102331 A1 | 5/2021 |
| WO | 2021/134450 A1 | 7/2021 |
| WO | 2021/179162 A1 | 9/2021 |
| WO | 2021/233416 A1 | 11/2021 |

OTHER PUBLICATIONS

Xiang-Jun, G. et al., "Design and application of high polarized purity metasurface lens," Acta Phys. Sin., vol. 66, Issue 20, pp. 204102-1-204102-10 (2017).

Xiong, L. et al., "Principles and applications of metasurfaces with phase modulation," Opto-Electronic Engineering, vol. 44, Issue 3, pp. 255-275 (2017).

Chang, G. et al., "Super diffraction imaging with wave vector selective metasurface," Acta Phys. Sin., vol. 66, Issue 14, pp. 147804-1-147804-6 (2017).

Li, K. et al., "Dispersion controlling of meta-lens at visible frequency," Optics Express, vol. 25, Issue 18, (Sep. 4, 2017).

Zho, R. et al., "Breaking the Diffraction Limit with Radially Polarized Light Based on Dielectric Metalenses," Advanced Optical Materials, pp. 1800795-1-1800795-8 (2018).

Zhuang, Z.P. et al., "High focusing efficiency in subdiffraction focusing metalens," Nanophotonics, vol. 8, Issue 7, pp. 1279-1289 (2019).

Zhao Mengmeng et al., "Narrowband Mid-infrared Adjustable Absorption Metasurfaces Based on Graphene Strips," Natural Sciences Journal of Harbin Normal University, vol. 135 Issue 6, pp. 65-70 (2019).

Liu, Z. et al., "Wide-angle Moire metalens with continuous zooming," Journal of the Optical Society of America B, vol. 36, Issue 10, pp. 2810-2816 (2019).

Kim, C. et al., "Doublet metalens design for high numerical aperture and simultaneous correction of chromatic and monochromatic aberrations," Optics Express, vol. 28, Issue 12, pp. 18059-18076 (2020).

Hao, C. et al., "Single-Layer Aberration-Compensated Flat Lens for Robust Wide-Angle Imaging," Laser & Photonics Reviews, pp. 2000017-1-2000017-10 (2020).

Zhang, F. et al., "Extreme-Angle Silicon Infrared Optics Enabled by Streamlined Surfaces," Advanced Optical Materials, vol. 33, pp. 2008157-1-2008157-9 (2021).

CN Office Action dated May 19, 2022 as received in Application No. 202210392652.9.

CN Decision to Grant Dated Jun. 16, 2022 as received in Application No. 202210392652.9.

International Search Report and Written Opinion of the International Searching Authority dated Jul. 20, 2023 as received in Application No. PCT/CN2023/085142.

METASURFACE-BASED IMAGING SYSTEM, DESIGN METHOD, AND DETECTOR

The present disclosure claims the priority to the Chinese patent application with the filing No. 202210392652.9 filed with the Chinese Patent Office on Apr. 15, 2022, the contents of which are incorporated herein by reference in entirety.

TECHNICAL FIELD

The present disclosure relates to the technical field of large field-of-view imaging, and specifically relates to a metasurface-based imaging system, a design method, and a detector.

BACKGROUND ART

The large field-of-view imaging is widely applied in actual life, from daily surveillance cameras to vehicle-mounted imaging devices, and large field-of-view imaging systems all play an important role. However, the large field-of-view imaging systems composed of traditional optical devices are often composed of devices made of multiple different materials and surface shapes, resulting in large volume, heavy weight, and complex system composition, which severely limits their development in fields with high requirements of integration. The metasurface-based large field-of-view imaging system, due to the characteristics of the metasurface itself being ultra-light, and ultra-thin, and unique optical field manipulation capability, solves these limitations to a certain extent. However, in such systems, although the quadratic-phase-based monolayer metasurface can achieve ultra-large field-of-view imaging, it faces serious spherical aberration and background noise issues. It often requires a front-positioned aperture stop to suppress spherical aberration, thereby improving the imaging performance of the system. However, the distance between the aperture stop and the metasurface increases as the system aperture increases, thus the thickness of the system will increase significantly, making it difficult for such systems to achieve large-area, ultra-thin, ultra-large field-of-view imaging. Meanwhile, the double-layer metasurface structure essentially arranges one metasurface at the position of the front-positioned aperture stop, which is still constrained by the mutual restriction between aperture and thickness. Additionally, its imaging field of view is limited, making it difficult to achieve large field-of-view imaging or large-aperture imaging. Moreover, such structures also face the challenge of center alignment between the two metasurfaces, making assembly and integration difficult. Although the multilayer metasurface structure does not require a front-positioned aperture stop, it is difficult to process, and the coupling effects between layers affects the performance, with large simulation computation requirements.

Therefore, how to achieve large-area, ultra-thin, large-field-of-view metasurface imaging is an urgent problem need to be solved.

SUMMARY

(1) Technical Problem to be Solved

In view of the above issues, the present disclosure provides a metasurface-based imaging system, a design method, and a detector to address the technical problems of large volumes and high integration difficulty in traditional imaging systems.

(2) Technical Solution

The first aspect of the present disclosure provides a metasurface-based imaging system, which, in an optical axis direction, sequentially includes: a quadratic-phase-based metasurface structure, consisting of a sub-wavelength unit structure array and a substrate, wherein the metasurface structure is a monolayer structure and is configured for implementing preset phase distribution; and a wavevector filter, each position of which is equivalent to an aperture stop, wherein the wavevector filter has a filtering function and has different wavevector modulation effects under different incident angles.

Further, the metasurface structure can achieve ±89° field-of-view imaging; the sub-wavelength unit structure array consists of multiple unit structures; the unit structure is a sub-wavelength pillar; and a period of the unit structure is p, and $0.1\lambda < p < \lambda$, wherein $\lambda$ is the design wavelength of the imaging system.

Further, the horizontal section of the sub-wavelength pillar is circular or a regular polygon. When the horizontal section is circular, the diameter of the circle is y, and $0.05p < y < p$. When the horizontal section is a regular polygon, the side length of the regular polygon is w, and $0.05p < w < p$. The height of the sub-wavelength pillar is h, and $0.22 < h < 3\lambda$. The regular polygon includes any one of a regular hexagon, a square, and a regular octagon.

Further, the material of the sub-wavelength unit structure array includes any one of silicon, titanium dioxide, and silicon nitride. The material of the substrate includes any one of sapphire and silicon dioxide. The material of the sub-wavelength unit structure array and the material of the substrate exhibit low loss for the design wavelength of the light.

Further, the wavevector filter is realized by a structure having any one of the functions including a narrowband filter function, a shortpass filter function, and a band-stop filter function.

Further, the wavevector filter is any one of an optical filter or an F-P cavity metasurface.

Further, the wavevector filter has a critical angle $\theta_r$ for the design wavelength. When the incident angle of the incident light is greater than the critical angle $\theta_r$, the incident light cannot pass through the wavevector filter.

Further, the wavevector filter is arranged on the substrate, with the wavevector filter and the sub-wavelength unit structure array respectively arranged on two surfaces of the substrate; or the wavevector filter is arranged on a receiving surface of the detector, and the receiving surface of the detector is configured to detect the light waves emitted by the imaging system.

Further, the imaging system satisfies the following conditions:

$0.25f \leq D \leq 5f$, and
$0.4f \leq TTL \leq 2f$, where $f$ is the focal length of the imaging system, D is the aperture stop diameter of the imaging system, and TTL is the optical total track length of the imaging system.

The second aspect of the present disclosure provides a design method for the aforementioned metasurface-based imaging system, which includes: S1, calculating a phase distribution of the metasurface structure according to a quadratic-phase formula; S2, determining a composition material of the metasurface structure based on the phase distribution and a design wavelength of the imaging system; S3, determining a geometric parameter and an arrangement of the sub-wavelength unit structure array according to the composition material; S4, using imaging simulation to determine an critical angle of the wavevector filter; and S5, designing a structure of the wavevector filter based on the critical angle.

The third aspect of the present disclosure provides a detector, and the detector includes the aforementioned metasurface-based imaging system.

The fourth aspect of the present disclosure provides a metasurface-based imaging system, wherein the imaging system includes: a quadratic-phase-based metasurface structure and a wavevector filter, wherein the quadratic-phase-based metasurface structure can achieve ±89° field-of-view imaging; and the wavevector filter has a critical angle $\theta_t$ for the design wavelength of the imaging system. When the incident angle to the wavevector filter is greater than the critical angle $\theta_t$, the incident wave cannot pass through the wavevector filter, and each position of the wavevector filter is equivalent to an aperture stop.

Further, the imaging system satisfies conditions of $0.25f \leq D \leq 5f$, and $0.4f \leq TTL \leq 2f$, where $f$ is the focal length of the imaging system, D is the aperture stop diameter of the imaging system, and TTL is the optical total track length of the imaging system.

Further, the quadratic-phase-based metasurface structure includes a unit structure array and a substrate, with the wavevector filter integrated onto the side of the substrate opposite the unit structure array.

Further, the unit structure array is composed of the unit structures, and the unit structure is a sub-wavelength pillar with a horizontal section that is circular or a regular polygon. Regarding the unit structure, the period is p, and $0.12 < p < \lambda$; the width is w, and $0.05p < w < p$; and the height is h, and $0.2\lambda < h < 3\lambda$. When the horizontal section is circular, the width w is the diameter, and when the horizontal section is a regular polygon, the width w is the side length; and $\lambda$ is the design wavelength of the imaging system. The material of the unit structure is silicon, titanium dioxide, or silicon nitride, and the unit structures are arranged in regular hexagon, square, or regular octagon on the substrate. The substrate is made of sapphire or silicon dioxide.

Further, the wavevector filter is realized by a structure functioning as a narrowband filter, a shortpass filter, or a band-stop filter.

Further, the wavevector filter is an optical filter, an F-P cavity metasurface, or a metasurface with a filtering function.

The fifth aspect of the present disclosure provides a design method for the metasurface-based imaging system, applied to the aforementioned metasurface-based imaging system. The method includes the following steps. Step 1: determining the design wavelength $\lambda$ of the imaging system, and the aperture stop diameter D, and the focal length $f$ of the imaging system, and obtaining the phase distribution $\varphi(r)$ of the quadratic-phase-based metasurface structure according to the quadratic-phase distribution formula $\varphi(r)=-k_0 r^2/2f$, wherein r is the distance from different positions of the metasurface structure to the center of the metasurface structure, and $k_0=2\pi/\lambda$ is the wavevector of the incident light in free space; and proceeding to Step 2. Step 2: selecting the material of the metasurface structure based on the phase distribution $\varphi(r)$ and the design wavelength of the imaging system, and using optical design software to design the geometric parameter and the arrangement of the unit structure of the corresponding metasurface structure; and proceeding to Step 3. Step 3: making each position of the wavevector filter equivalent to one aperture stop; determining the value of the critical angle $\theta_t$ of the wavevector filter, wherein the value of $\theta_t$ determines the diameter of the equivalent aperture stop, including: step 1), pre-setting an initial value $\theta_{t0}$ of the critical angle, conducting imaging simulation, and comparing with the imaging system without a wavevector filter, wherein when a modulus of an optical transfer function of the imaging system designed with the critical angle $\theta_{t0}$ reaches 0.25, the corresponding spatial frequency increases, the selected detector can detect the corresponding size at its cutoff frequency, and then the value of the critical angle $\theta_t$ is $\theta_{t0}$; and proceeding to Step 4, otherwise, proceeding to step 2); and step 2) fine-tuning $\theta_{t0}$ and repeating step 1). Step 4: designing the wavevector filter based on the value of the critical angle $\theta_t$.

Further, the material of the metasurface structure includes the material of the unit structure and the material of the substrate. The material of the unit structure and the material of the substrate exhibit low loss for light waves at the design wavelength $\lambda$.

Further, the Step 4 of designing the wavevector filter based on the value of the critical angle $\theta_t$, includes selecting any one of a narrowband filter, shortpass filter, or band-stop filter with the critical angle $\theta_t$.

The sixth aspect of the present disclosure provides a detector, and the detector includes the aforementioned imaging system.

(3) Beneficial Effects

The metasurface-based imaging system, the design method, and the detector of the present disclosure adopt a monolithic metasurface structure, which is capable of achieving high-quality imaging with an ultra-large field of view, and has structure characteristics being ultra-light, ultra-thin, and compact. Additionally, by utilizing the wavevector filter that is sensitive only to the incident angle, with different wavevector modulation effects at different incident angles, the imaging quality of the imaging system is greatly improved while maintaining the ultra-thinness of the imaging system. At the same time, the wavevector filter is not configured to achieve a specific phase distribution, thereby reducing the difficulty of assembly and integration.

REFERENCE NUMERALS

1—sub-wavelength unit structure array, 2—substrate, 3—wavevector filter.

DETAILED DESCRIPTION OF EMBODIMENTS

In order to make the objectives, technical solutions, and advantages of the present disclosure clearer and more understandable, the present disclosure is described in further detail hereinafter in connection with specific embodiments and with reference to the drawings.

The terms used herein are solely for describing specific embodiments and are not intended to limit the present disclosure. Terms such as "comprise", "include", etc., indicate the presence of the mentioned features, steps, operations, and/or components but do not exclude the presence or addition of one or more other features, steps, operations, or components.

Figure 1:
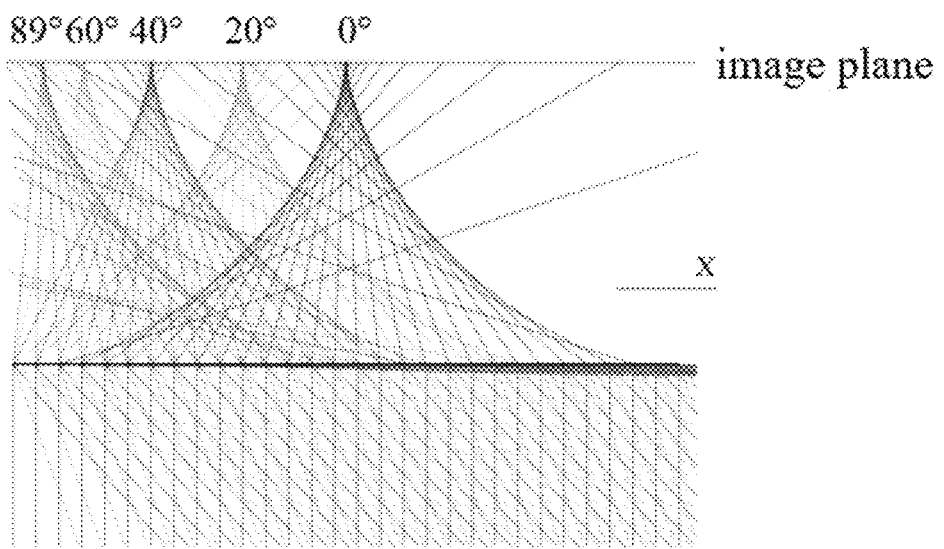
FIG. 1 schematically shows an imaging diagram of a traditional monolithic metasurface-based imaging system based on a quadratic-phase.

FIG. 1 shows an imaging diagram of a traditional monolithic metasurface-based imaging system based on a quadratic-phase, and the resulting quadratic-phase distribution formula is:

$$\varphi(r) = -k_0 \frac{r^2}{2f}, \quad (1)$$

where $\varphi(r)$ is the phase distribution of the metasurface, r is the distance from different positions on the metasurface to the center of the metasurface, $k_0$ represents the wavevector of light in free space; and $k_0 = 2\pi/\lambda$, where $\lambda$ is the wavelength of the incident light, and $f$ is the focal length of the imaging system.

In traditional monolithic quadratic-phase-based metasurface, as the aperture size increases, light from different fields of view (i.e., different incident angles) cannot focus well at a single point, resulting in significant spherical aberration and, consequently, lower imaging quality. This happens because when parallel incident light hits the metasurface at an incident angle θ, the phase distribution is given by:

$$\varphi(r, \theta) = -\frac{k_0}{2f}r^2 - k_0 x\sin\theta = -\frac{k_0}{2f}\left[(x + f\sin\theta)^2 + y^2\right] + \frac{fk_0\sin^2\theta}{2}. \quad (2)$$

In the above phase formula (2), $k_0 x \sin\theta$ is the phase imposed by oblique incidence. From the formula (2), it can be seen that under oblique incidence, the quadratic-phase-based metasurface only undergoes spatial displacement in the x direction compared to normal incidence, with an offset of $-f \sin\theta$. In other words, the incident light from different fields of view undergoes spatial displacement on the focal plane, and the offset of the focal point from the center is $f \sin(\theta)$. Therefore, although the traditional monolithic quadratic-phase-based metasurface can achieve ultra-wide field-of-view imaging, it simultaneously induces relatively large spherical aberration, as shown in FIG. 1, which severely reduces the imaging quality of the imaging system.

Figure 2:
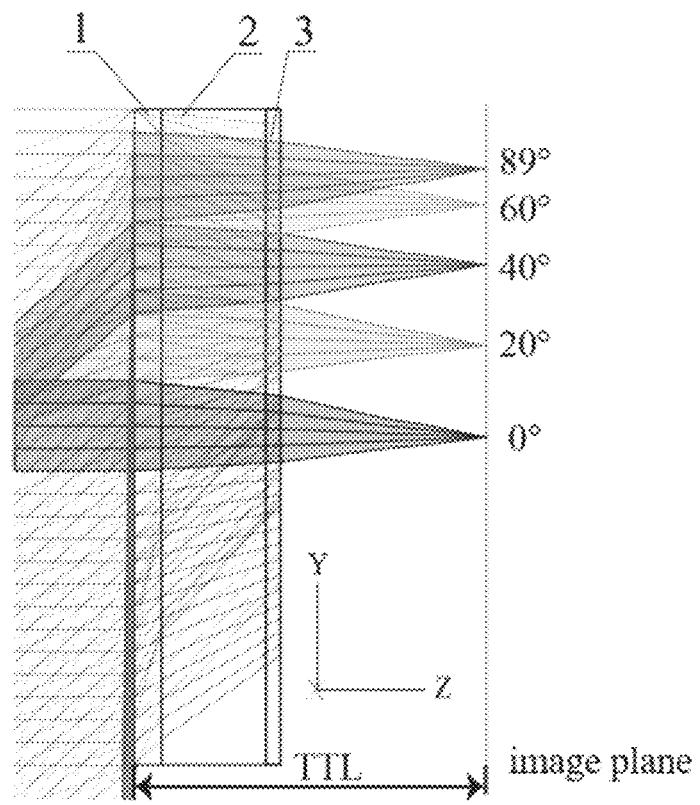
FIG. 2 schematically shows a structure diagram of a metasurface-based imaging system according to an embodiment of the present disclosure.

To address the above problem, namely, to reduce the size and weight of the system, correct spherical aberration, and achieve true ultra-thin large field-of-view imaging and large-area imaging, the present disclosure provides a metasurface-based imaging system. As shown in FIG. 2, in an optical axis direction, the imaging system sequentially comprises: a quadratic-phase-based metasurface structure, consisting of a sub-wavelength unit structure array 1 and a substrate 2, the metasurface structure being a monolayer structure and used for implementing preset phase distribution; and a wavevector filter 3, each position of which is equivalent to one aperture stop, wherein the wavevector filter has a filtering function and has different wavevector control effects under different incident angles.

The quadratic-phase-based metasurface structure uses a monolayer structure, avoiding the issues of large volume, heavy weight, and complex structure that traditional large field-of-view imaging systems face, thus enabling large-area, ultra-thin, and ultra-large field-of-view imaging. Simultaneously, the wavevector filter 3 is sensitive only to the incident angle and has different wavevector modulation effects under different incident angles, thus effectively correcting spherical aberration and background noise at the image plane. This improves the system imaging quality while maintaining the ultra-thin nature of the imaging system. Additionally, the wavevector filter is not configured to achieve specific phase distribution, thereby reducing the difficulty of assembly and integration. The imaging system of the present disclosure avoids the problem of increasing system thickness as the aperture enlarges due to the addition of a front aperture stop. This allows the imaging system to break free from the restriction relationship between aperture and thickness, thus achieving ultra-thin, ultra-large field-of-view imaging with large apertures and allowing for a higher image quality.

The following explains the principle of the ultra-thin, large field-of-view imaging system with reference to the figure. As shown in FIG. 2, the large-field-of-view parallel incident light obliquely enters the sub-wavelength unit structure array 1 of the metasurface structure. Taking an incident angle of 89° as an example, the incident light passes through the substrate 2 and then enters the wavevector filter 3. When the incident angle on the wavevector filter 3 is greater than the designed critical angle $\theta_t$, the incident light cannot pass through the wavevector filter 3. For incident light with an angle smaller than $\theta_t$, it passes through the wavevector filter 3 and is focused at an offset of $f \sin(89°)$ from the center of the image plane, thus forming a clear image.

Based on the above embodiment, the metasurface structure can achieve ±89° field-of-view imaging; the sub-wavelength unit structure array 1 consists of multiple unit structures; the unit structure is a sub-wavelength pillar; and a period of the unit structure is p, and $0.1\lambda < p < \lambda$, wherein $\lambda$ is the design wavelength of the imaging system. The horizontal section of the sub-wavelength pillar is circular or a regular polygon. When the horizontal section is circular, the diameter of the circle is y, and $0.05p < y < p$. When the horizontal section is a regular polygon, the side length of the regular polygon is w, and $0.05p < w < p$. The height of the sub-wavelength pillar is h, and $0.2\lambda < h < 3\lambda$. The regular polygon includes any one of a regular hexagon, a square, and a regular octagon.

Figure 3:
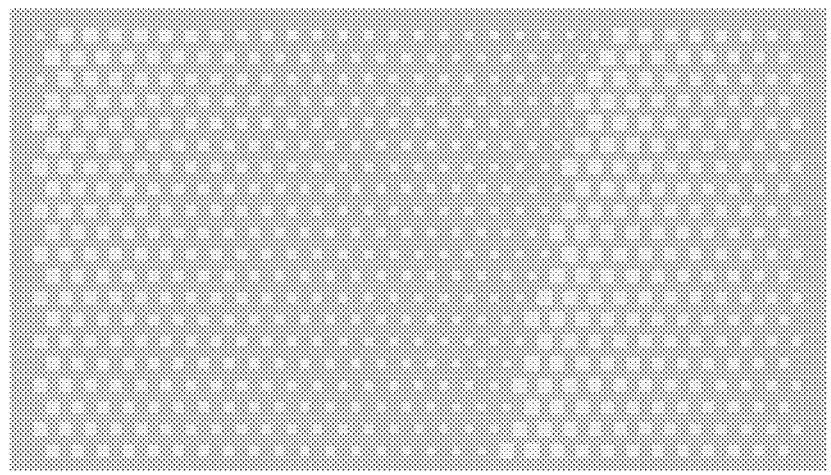
FIG. 3 schematically shows a partial top view of a sub-wavelength unit structure array in a metasurface-based imaging system according to an embodiment of the present disclosure.
Figure 4:
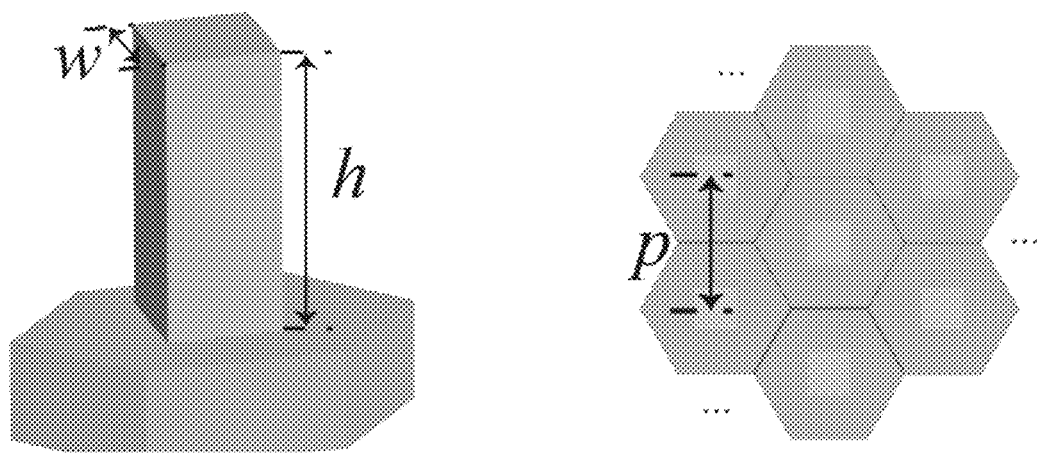
FIG. 4 schematically shows a schematic diagram of a unit structure in a sub-wavelength unit structure array and a schematic diagram of an arrangement of unit structures according to an embodiment of the present disclosure.

As shown in FIG. 3, the sub-wavelength unit structure array 1 is composed of sub-wavelength unit structures, where each unit structure is a sub-wavelength pillar. In FIG. 4, the horizontal section of the sub-wavelength pillar is square, where the side length w of the square satisfies $0.05p < w < p$, and the height h satisfies $0.2\lambda < h < 3\lambda$. According to the principle of propagation phase, by designing unit structures (i.e., sub-wavelength pillars) of different sizes at various positions on the metasurface structure, the desired phase distribution for the imaging system can be achieved. Specifically, optical design software can be used to design the specific arrangement of the unit structures to realize a quadratic-phase distribution. The design wavelength of the imaging system can be in the visible wavelength range or infrared wavelength range, and by following the design method below, the materials and parameters of the imaging system can be appropriately designed and optimized. Through structural optimization of the design, the present disclosure enables the designed imaging system to achieve a large field-of-view imaging of 178°.

Based on the above embodiment, the material of the sub-wavelength unit structure array 1 includes any one of silicon, titanium dioxide, and silicon nitride. The material of the substrate 2 includes any one of sapphire and silicon dioxide. The materials of the sub-wavelength unit structure array 1 and the substrate 2 possess low loss for the light wave in the design wavelength.

The sub-wavelength unit structure array 1 can be arranged on the substrate 2 in a regular hexagonal lattice, a square lattice, or a regular octagonal lattice, making the unit structure nearly isotropic. As shown in FIG. 3, the sub-wavelength unit structure array 1 is arranged in a hexagonal lattice on the substrate 2.

Based on the above embodiment, the wavevector filter 3 is realized by a structure having any one of the functions including a narrowband filter function, a shortpass filter function, and a band-stop filter function.

For example, the wavevector filter 3 can be a filter (such as a multilayer interference filter), an F-P cavity metasurface, or another metasurface with a filtering function. The wavevector filter 3 is sensitive only to the incident angle and is not configured to achieve a specific phase distribution. Therefore, it eliminates the problem of center alignment of conventional metasurfaces, which reduces the difficulty of assembly and integration.

Based on the above embodiment, the wavevector filter 3 has a critical angle $\theta_t$ for the design wavelength. When the angle of the incident light is greater than the critical angle $\theta_t$, the incident light cannot pass through the wavevector filter 3.

Figure 5:
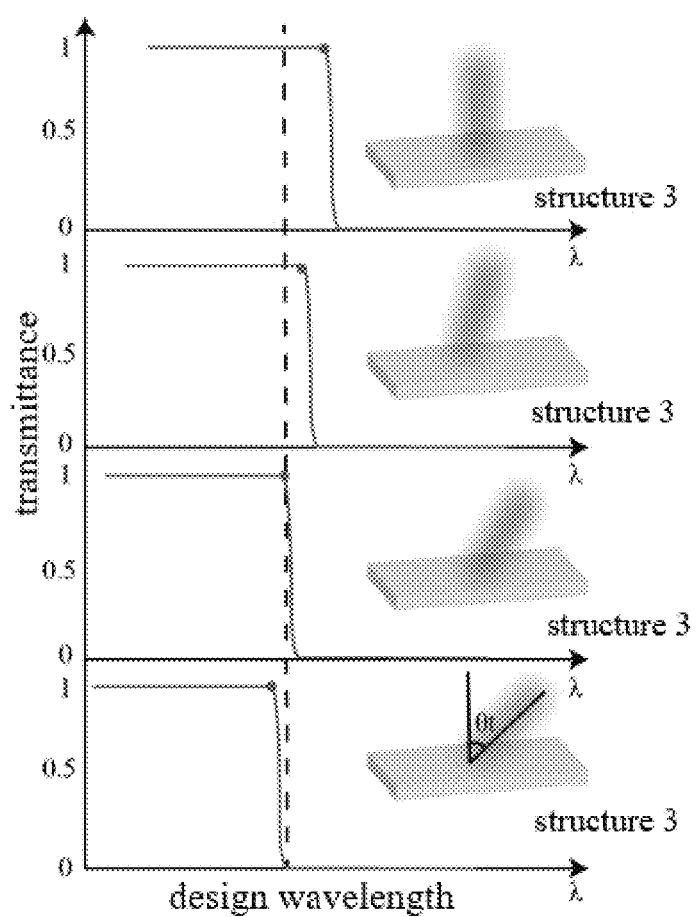
FIG. 5 schematically shows a schematic diagram of regulation principle of a wavevector filter in a metasurface-based imaging system according to an embodiment of the present disclosure.

By designing a corresponding wavevector filter 3 to be sensitive to the incident angle based on the imaging results of the designed quadratic-phase-based metasurface, the imaging quality of the system can be improved under a large field of view, while maintaining the ultra-thin design of the system. As shown in FIG. 5, when the incident angle increases, the wavelength of light allowed to pass through the wavevector filter 3 shifts toward short wavelengths, i.e., a blue shift occurs. This means that for a certain incident wavelength, there exists a critical angle $\theta_t$, and when the incident angle to the wavevector filter 3 is greater than the critical angle $\theta_t$, the incident wave at that location will not be able to pass through the wavevector filter 3. In FIG. 5, the dashed line represents the design wavelength of the imaging system. Thus, each position of the wavevector filter 3 is equivalent to one aperture stop, where the critical angle determines whether the incident light is allowed to pass through. The value of the critical angle $\theta_t$ defines the diameter of the equivalent aperture stop. At a certain design wavelength, light waves incident on the wavevector filter 3 with an incident angle greater than the critical angle $\theta_t$ cannot pass through the wavevector filter 3, thereby effectively correcting spherical aberration and background noise at the image plane, and improving the imaging quality of the system.

Based on the above embodiment, the wavevector filter 3 is arranged on the substrate 2, with the wavevector filter 3 and the sub-wavelength unit structure array 1 respectively arranged on two surfaces of the substrate 2; or the wavevector filter 3 is arranged on a receiving surface of the detector, and the receiving surface of the detector is configured to detect the light waves emitted by the imaging system.

The wavevector filter 3 can be integrated onto the other side of the substrate 2 of the metasurface structure, as shown in FIG. 2; or, the wavevector filter 3 can be directly integrated into the detector, thereby forming an integrated structure with the detector to realize a highly integrated system that is compact, light and thin. The detector is configured to receive the light waves from the imaging system, and its structure is well-known to those skilled in the art, hence it is not shown in the drawings. The position for integrating the wavevector filter 3 can be determined according to the actual application requirements. If one detector is used in conjunction with the imaging system, the wavevector filter 3 can be integrated into the detector, thus making the fabrication for the metasurface structure more convenient. If the imaging system needs to be paired with different detectors in various applications according to the actual requirements, the wavevector filter 3 can be integrated into the substrate 2 of the metasurface structure so as to facilitate easier replacement for the detector.

Based on the above embodiment, the imaging system satisfies the following conditions simultaneously:

$0.25f \leq D \leq 5f$, and
$0.4f \leq TTL \leq 2f$, where $f$ is the focal length of the imaging system, D is the aperture stop diameter of the imaging system, and TTL is the optical total track length of the imaging system.

As shown in FIG. 2, the optical total track length (TTL) of the imaging system refers to the distance between the first surface of the imaging system and the photosensitive surface of the detector (the image plane in FIG. 2). The diameter of the metasurface structure corresponds to the physical diameter of the imaging system aperture stop, the wavevector filter 3 is the equivalent aperture stop, and D is the aperture stop diameter of the imaging system. For example, the focal length $f$ of the system is 5 mm, the aperture stop D is 11 mm, and the optical total track length (TTL) is 6.38 mm, with the thickness of the optical devices in the system being only 2.45 mm. The system is therefore light and thin.

Figure 6:
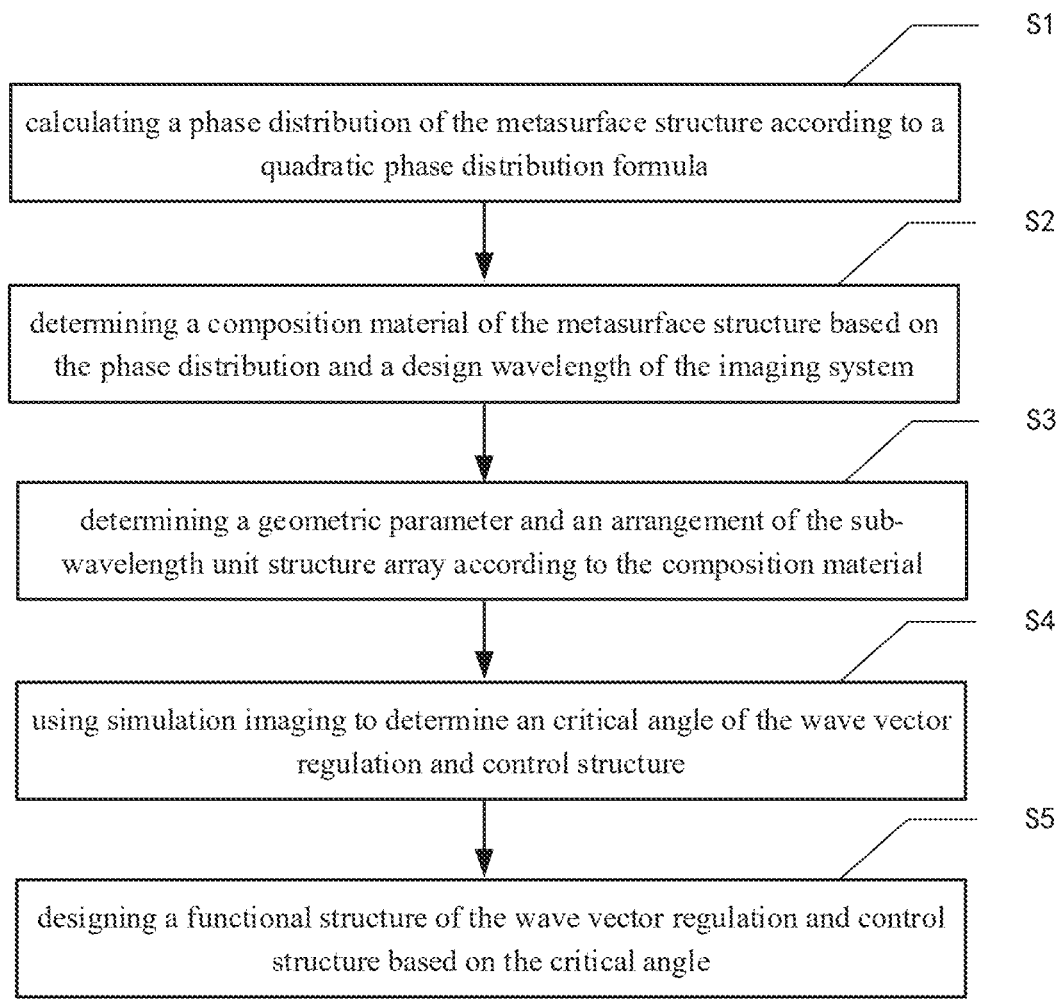
FIG. 6 schematically shows a flowchart of a design method of a metasurface-based imaging system according to an embodiment of the present disclosure.

The present disclosure further provides a design method for the aforementioned metasurface-based imaging system, as shown in FIG. 6, which includes: S1, calculating a phase distribution of the metasurface structure according to a quadratic-phase distribution formula; S2, determining a composition material of the metasurface structure based on the phase distribution and a design wavelength of the imaging system; S3, determining a geometric parameter and an arrangement of the sub-wavelength unit structure array 1 according to the composition material; S4, using imaging simulation to determine a critical angle of the wavevector filter 3; and S5, designing a functional structure of the wavevector filter 3 based on the critical angle.

Specifically, in step S1, the target design wavelength $\lambda$, and the diameter y or the side length w, and the focal length $f$ of the sub-wavelength pillar of the system are determined. Based on the quadratic-phase distribution formula $$\varphi(r) = -k_0 \frac{r^2}{2f},$$

the phase distribution $\varphi(r)$ of the quadratic-phase-based metasurface structure is obtained.

In step S2, according to the phase distribution $\varphi(r)$, the material of the metasurface structure is selected for the design wavelength, including the material of the unit structure and the material of the substrate. A person skilled in the art can select low-loss materials corresponding to the wavelength band based on the design wavelength $\lambda$ from conventional optical materials. For example, when the design wavelength is 830 nm, the sub-wavelength unit structure array 1 can be made of silicon, titanium dioxide, or silicon nitride, and the substrate 2 can be made of sapphire or silicon dioxide. Optical design software is used to design the geometric parameters and the arrangement of the corresponding sub-wavelength unit structure array 1. The specific optical design software, such as CST or FDTD, can be chosen according to the practical needs of those skilled in the art.

In step S3 of determining the value of the critical angle $\theta_t$ of the wavevector filter 3, an initial value $\theta_{t0}$ of the critical angle is pre-set for imaging simulation and verified for design effectiveness. Compared with the imaging system without a wavevector filter 3, when a modulus of a designed optical transfer function reaches 0.25, the corresponding spatial frequency increases, which can distinguish higher frequency information. At the same time, the corresponding spatial frequency can also be detected at the cutoff frequency of the selected detector, and then the value of the critical angle $\theta_t$ is $\theta_{t0}$. Otherwise, step S3 is repeated after fine-tuning $\theta_{t0}$ until the previous requirement is satisfied.

In Step S4, the wavevector filter 3 is designed according to the value of the critical angle $\theta_t$. For example, the narrowband filter, the shortpass filter, or the band-stop filter with the critical angle $\theta_t$ can be selected.

The present disclosure also provides a detector, and the detector includes the aforementioned metasurface-based imaging system.

The detector is configured to receive the light waves from the metasurface-based imaging system. The position for integrating the portion of wavevector filter part that is sensitive to the incident angle can be determined according to the actual application requirements. If one detector is used in conjunction with the imaging system, the wavevector filter can be integrated into the detector, thus making the fabrication for the metasurface structure more convenient. If the imaging system needs to be paired with different detectors in various application scenarios according to the requirements for imaging, the wavevector filter can be integrated into the metasurface structure so as to facilitate easier replacement for the detector.

In summary, the beneficial effects of the present disclosure are as follows.

First, compared to large field-of-view imaging systems based on traditional optical devices and metasurface large field-of-view imaging systems based on quadratic-phase, the metasurface-based imaging system provided in the present disclosure avoids the issues of large volume, heavy weight, and complex composition faced by the former, but also avoids the problem encountered by the latter, where the thickness increases with the system diameter so that an ultra-thin structure is unable to be realized. At the same time, the imaging system provided in the present disclosure not only achieves high-quality imaging with an ultra-large field of view of ±89° but also has the advantages of being ultra-light, ultra-thin, and compact in structure.

Second, compared to two-piece metasurface structure, where one metasurface is arranged at the position of the aperture stop, the wavevector filter adopted by the present disclosure is sensitive only to the incident angle and is not configured to achieve a specific phase distribution. Therefore, it eliminates the problem of center alignment of conventional metasurfaces, which reduces the difficulty of assembly and integration. Compared to multilayer metasurface structures that do not require a front aperture stop, the monolayer metasurface structure in the present disclosure has lower processing difficulty, no coupling effects between layers, and a smaller simulation workload, and is easier to achieve larger areas.

Finally, the integrated design of the imaging system in the present disclosure offers high adjustability, where it can be used both in active lighting conditions and in passive lighting situations in outdoor environments. Under active illumination, the selected light source can provide light at the design wavelength. When used outdoors, since natural light in the environment spans a certain wavelength range, a narrowband filter can be arranged to the front end of the imaging system to filter out stray light from the environment, thus enabling imaging in outdoor conditions. Therefore, the imaging system of the present disclosure is suitable for a variety of application scenarios.

The following will further explain the present disclosure through specific examples. The following embodiments provide specific descriptions of the metasurface-based imaging system, the design method, and the detector described above. However, the following examples are intended to exemplify the present disclosure only, and the scope of the present disclosure is not limited thereto.

The metasurface-based imaging system of the present disclosure includes, sequentially along the optical axis direction, a quadratic-phase-based metasurface structure and a wavevector filter 3 sensitive to the incident angle. The metasurface structure includes a sub-wavelength unit structure array 1 and a substrate 2, with the wavevector filter 3 and the sub-wavelength unit structure array 1 respectively arranged on the two surfaces of the substrate 2, as shown in FIG. 2.

In the embodiment, the design wavelength of the imaging system is 830 nm. The imaging system simultaneously satisfies the following conditions: $0.25f \leq D \leq 5f$ and $0.4f \leq TTL \leq 2f$, where $f$ is the focal length of the imaging system, D is the diameter of the aperture stop of the imaging system, and TTL is the optical total track length of the imaging system. In the embodiment, the focal length $f$ of the system is 5 mm, the aperture stop diameter D is 11 mm, and the optical total track length (TTL) is 6.38 mm, with the thickness of the optical devices in the system being only 2.45 mm. The system is therefore light and thin.

Figure 7:
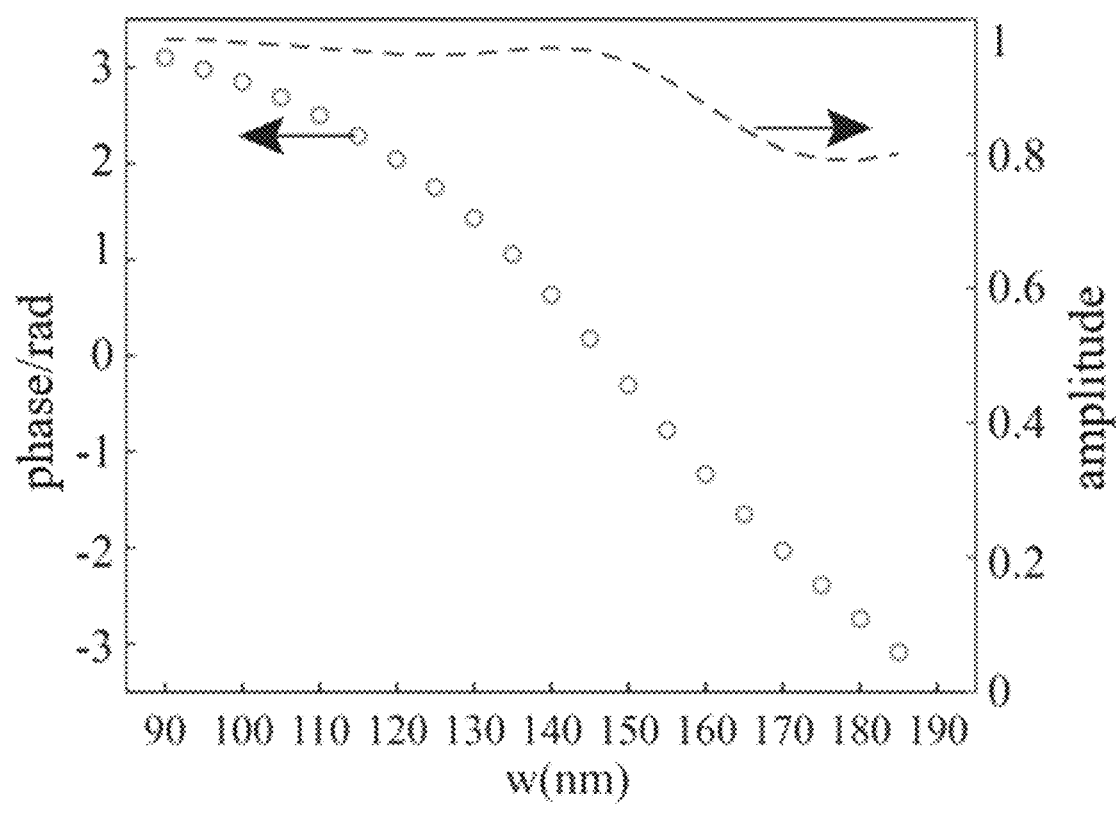
FIG. 7 schematically shows the simulated amplitude and propagation phase of unit structures of a quadratic-phase-based metasurface according to an embodiment of the present disclosure.

In the embodiment, the material of the sub-wavelength unit structure array 1 is silicon, and the material of the substrate 2 is sapphire. The partial schematic diagram of the arrangement of the unit structure of the metasurface structure, designed using optical software, is shown in FIG. 4, where the unit structure is a sub-wavelength square pillar arranged in a hexagonal lattice, whose period p is 390 nm, the height h is 600 nm, and the width w ranges from 90 to 185 nm. As shown in FIG. 7, the metasurface structure in the embodiment can achieve $0$-$2\pi$ phase coverage with high efficiency.

Figure 8:
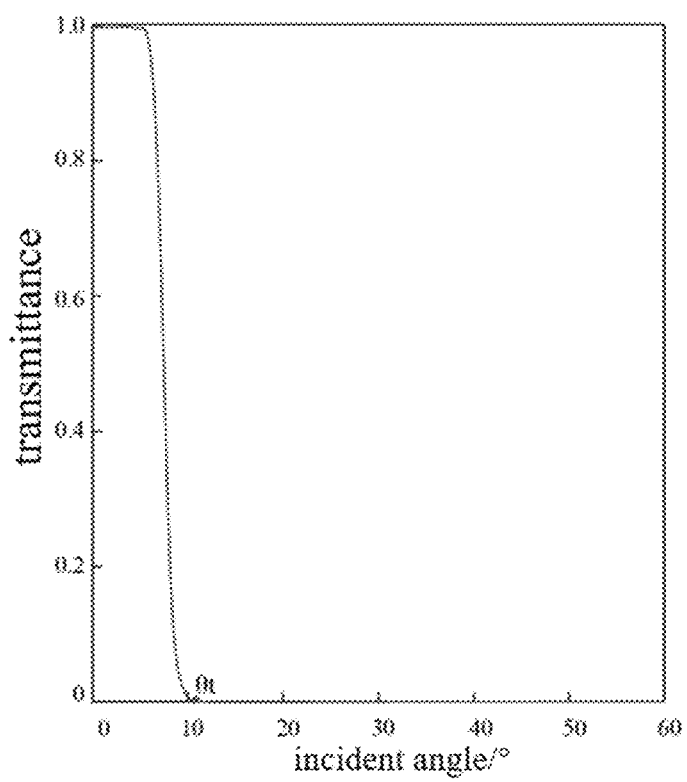
FIG. 8 schematically shows a diagram of a transmission spectrum of a wavevector filter according to an embodiment of the present disclosure.

In the embodiment, the wavevector filter 3 is a narrow-band filter composed of a traditional multilayer film structure to realize the function of wavevector regulation and control, with a critical angle of 12.5°. As shown in FIG. 8, the transmittance at the design wavelength of the system varies with the incident angle.

Figure 9:
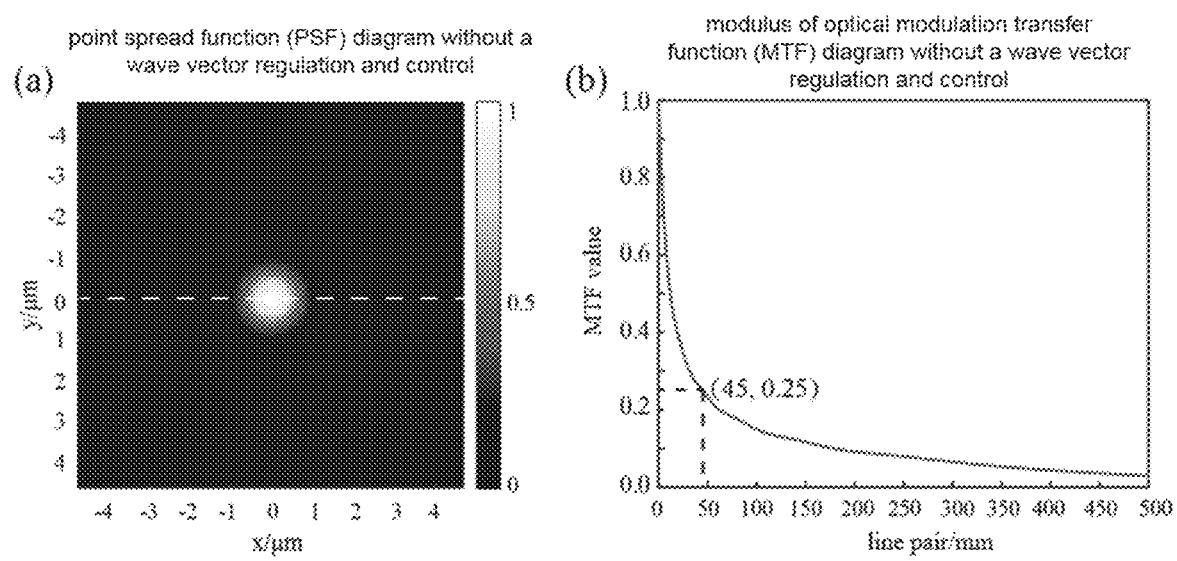
FIG. 9(a) schematically shows the point spread function (PSF) diagram of an imaging system without a wavevector filter according to an embodiment of the present disclosure.
FIG. 9(b) schematically shows an optical modulation transfer function (MTF) diagram of an imaging system without a wavevector filter according to an embodiment of the present disclosure.
Figure 10:
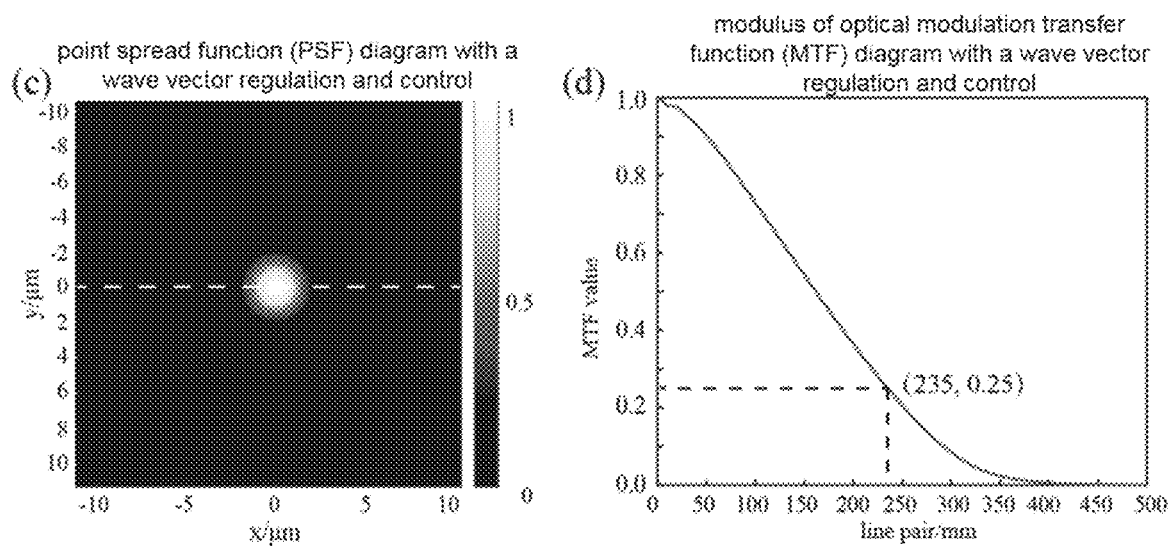
FIG. 10(c) schematically shows a point spread function (PSF) diagram of an imaging system with a wavevector filter according to an embodiment of the present disclosure.
FIG. 10(d) schematically shows an optical modulation transfer function (MTF) diagram of an imaging system with a wavevector filter according to an embodiment of the present disclosure.
Figure 11:
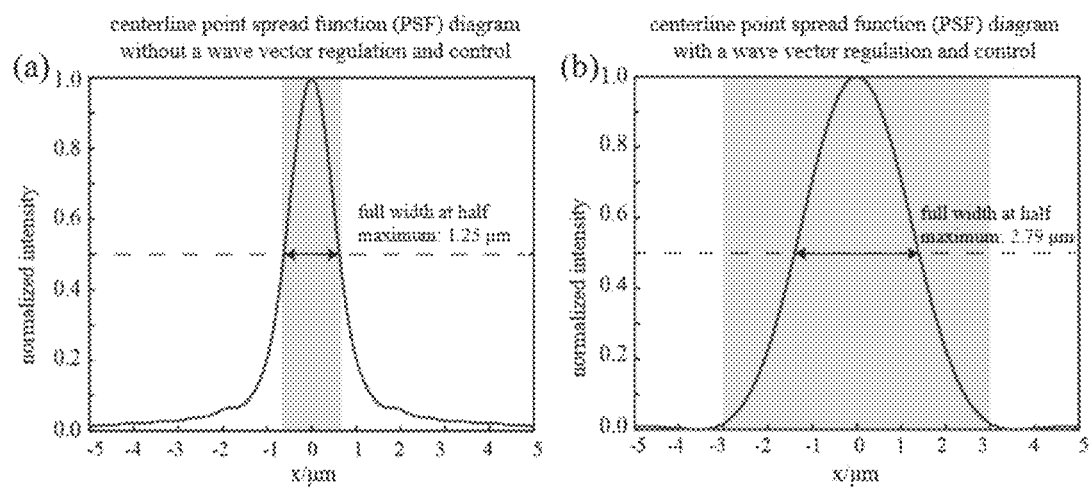
FIG. 11(a) schematically shows a comparison diagram of the point spread function for an imaging system without a wavevector filter according to an embodiment of the present disclosure.
FIG. 11(b) schematically shows a comparison diagram of a centerline point spread function for an imaging system with a wavevector filter according to an embodiment of the present disclosure.

To better illustrate the advantages of the imaging system designed using the design method, the imaging performances and the imaging simulation effects of a monolayer quadratic-phase-based metasurface structure (without wavevector filter) and the imaging system (with wavevector filter) in the embodiment of the present disclosure are compared. FIGS. 9 and 10 are comparison diagrams of the imaging performances of the metasurface-based imaging system without a wavevector filter and the metasurface-based imaging system in the embodiment of the present disclosure. FIG. 9(a) is a point spread function (PSF) diagram of an imaging system without a wavevector filter. FIG. 9(b) is an optical modulation transfer function (MTF) diagram of an imaging system without a wavevector filter. FIG. 10(c) is a point spread function (PSF) diagram of an imaging system in the embodiment of the present disclosure. FIG. 10(d) is an optical modulation transfer function (MTF) diagram of an imaging system in the embodiment of the present disclosure. The point spread function and the optical modulation transfer function (optical transfer function) are important indicators for evaluating the imaging performance of an optical system. The smaller the point spread function size is, the closer it is to the Airy disk, and the closer the value of the optical modulation transfer function is to 1, the better the imaging performance of the system is. By comparing FIG. 9(a) and FIG. 10(c), it can be observed that the point spread function radius of the monolayer quadratic-phase metasurface structure system is smaller than that of the imaging system in the embodiment of the present disclosure. To more intuitively represent the point spread function of the system, the point spread function along the centerline (as shown by the dashed lines in FIG. 9(a) and FIG. 10(c)) is plotted, and its full width at half maximum is obtained. As shown in FIG. 11, the gray parts in the figures represent the region within the size range of the Airy disk. FIG. 11(a) is a comparison diagram of a centerline point spread function for an imaging system without a wavevector filter, and FIG. 11(b) is a comparison diagram of a centerline point spread function for an imaging system in the embodiment of the present disclosure. As can be seen from the figure, the full width at half maximum of the monolayer quadratic-phase-based metasurface structure is 1.25 μm, and the full width at half maximum of the imaging system in the embodiment of the present disclosure is 2.79 μm. This is because that due to the effect of the wavevector filter 3, which is sensitive to the incident angle, the effective numerical aperture of the system alters, thus resulting in a change in the size of the corresponding Airy disk. In an ideal aberration-free optical system, the concentrating intensity of light within the Airy disk is 100%, meaning that the higher the concentrating intensity of light within the Airy disk is, the smaller the aberration of the system is. From FIG. 11(a), it can be seen that the edge value of the point spread function without the wavevector filter is still relatively high, and the concentrating intensity of light within the Airy disk is low, with a specific value of 6.96%. This indicates that the aberration is large, there is significant background stray light, and the imaging quality of the system is low. As shown in FIG. 11(b), a concentrating percentage of the light within the Airy disk on the imaging plane in the embodiment is quite high, reaching 92.18%, which is much closer to 100% than the system without the wavevector filter. This makes the system closer to an aberration-free system, thus allowing for a higher imaging quality. By comparing the optical transfer function diagrams in FIG. 9(b) and FIG. 10(d), it can be observed that the optical transfer function of the embodiment of the present disclosure is significantly higher than that of the monolayer quadratic-phase-based metasurface structure system. According to practical experience, when the MTF value of a system is greater than 0.25, the corresponding spatial frequency is considered discernible. As shown in the figure, for the system without wavevector regulation and control, at MTF of 0.25, the spatial frequency is 45 line pairs per millimeter. In the system of the embodiment of the present disclosure, at MTF of 0.25, the corresponding spatial frequency is 235 line pairs per millimeter. Compared to the system without the wavevector regulation and control, the resolution of the system in the embodiment of the present disclosure is improved by more than five times. Therefore, combining these two aspects, it is evident that the imaging performance of the system in the embodiment of the present disclosure surpasses that of the monolithic quadratic-phase metasurface structure system.

Figure 12:
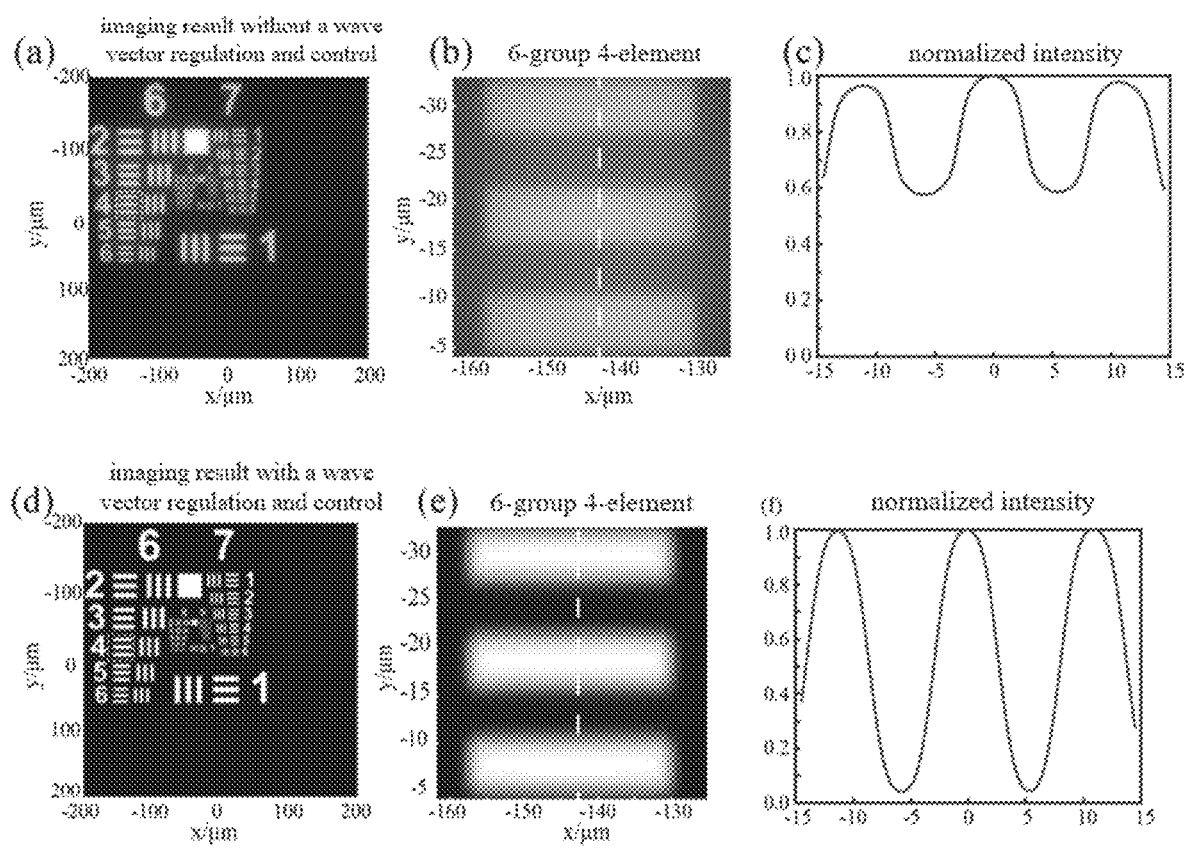
FIGS. 12(a) to (c) respectively schematically show a diagram of imaging simulation results of a system without a wavevector filter for a resolution target, a 6-group 4-element diagram of imaging results of a corresponding resolution target, and a diagram of a normalized intensity of a centerline of the 6-group 4-element in the imaging results of the resolution target according to an embodiment of the present disclosure.
FIGS. 12(d) to (f) respectively schematically show a diagram of imaging simulation results of an imaging system with a wavevector filter for a resolution target, a 6-group 4-element diagram of imaging results of a corresponding resolution target, and a diagram of a normalized intensity of a centerline of the 6-group 4-element in the imaging results of the resolution target according to an embodiment of the present disclosure.

To further clarify the improvement in imaging quality of the system brought by the wavevector filter 3, an imaging simulation verification is performed by using the USAF1951 resolution target in the embodiment of the present disclosure. FIG. 12 shows the diagrams of the imaging simulation results and specific characterizations of the system without the wavevector filter and the embodiment of the present disclosure. FIGS. 12(a), (b), and (c) respectively show a diagram of imaging simulation results of the system for a resolution target, a 6-group 4-element diagram of imaging results of a corresponding resolution target, and a diagram of a normalized intensity of a centerline of the 6-group 4-element in the imaging results of the resolution target with a system without a wavevector filter at normal incidence. FIGS. 12(d), (e), (f) respectively show a diagram of imaging simulation results of a system according to an embodiment of the present disclosure for a resolution target at normal incidence, a 6-group 4-element diagram of imaging results of a corresponding resolution target, and a diagram of a normalized intensity of a centerline of the 6-group 4-element in the imaging results of the resolution target. By comparing FIGS. 12(a) and (d), it can be seen that the imaging quality of the system in the embodiment of the present disclosure is higher, and it closely resembles the desired resolution target diagram, thus indicating that the imaging results of the embodiment of the present disclosure are superior to the imaging results of the system without a wavevector regulation and control. To specifically characterize and compare the results, FIGS. 12(b) and (e) respectively intercept and enlarge the diagrams of the imaging simulation results for 6-group 4-element of the two systems. It can be clearly seen that the background stray light in the embodiment of the present disclosure is much lower than that in the system without a wavevector regulation and control. Contrast is commonly used to reflect the resolving power of an imaging system. It is defined as the ratio of the difference in brightness between the highest and lowest intensity regions in the imaging results to the sum of their brightness values. The higher the contrast value is, the higher the imaging resolution of the system is. Therefore, the contrast of the imaging results for 6-group 4-element is specifically analyzed. As shown in FIGS. 12(c) and (f), the contrast of the imaging results for the system without a wavevector filter is relatively low, with the contrast of the imaging simulation results being only 0.2688. However, in the embodiment of the present disclosure, the contrast of the imaging simulation results at the centerline of the 6-group 4-element from the resolution target is 0.9185, which is significantly improved compared to the contrast of the system without a wavevector filter. Therefore, the imaging quality of the system is significantly enhanced compared to the imaging system without a wavevector filter.

It can be seen that the system and design method provided by the present disclosure can achieve ultra-thin, ultra-large field-of-view imaging under large apertures while maintaining high imaging quality. On one hand, compared to traditional ultra-large field-of-view imaging systems, the system adopts a planar integrated design, which is not only more compact and lightweight structurally but also easier to assemble, making it more suitable for systems with high requirements in miniaturization and flatness. On the other hand, compared to the currently provided metasurface structure-based ultra-large field-of-view imaging system, the system, under large-aperture imaging, will not be affected by the aperture diameters causing an increase in thickness, thereby continuing to maintain its ultra-light and ultra-thin characteristics; it can also maintain high imaging quality. Therefore, the metasurface-based imaging system and design method provided by the present disclosure hold significant potential for applications in the field of ultra-thin, large-aperture, large field-of-view imaging.

The specific embodiments described above illustrate in further detail the objectives, technical solutions, and beneficial effects of the present disclosure. It should be understood that the foregoing are only specific embodiments of the present disclosure and are not intended to limit the present disclosure. Any modifications, equivalent substitutions, improvements, etc., made within the spirit and principles of the present disclosure shall be included within the scope of protection of the present disclosure.

The invention claimed is:

1. A metasurface-based imaging system, wherein the imaging system comprises
a quadratic-phase-based monolayer metasurface structure and a wavevector filter sequentially arranged in an optical axis direction, wherein
the quadratic-phase-based monolayer metasurface structure can achieve ±89° field-of-view imaging; the wavevector filter has a critical angle $\theta_t$ for a design wavelength of the imaging system; when an incident angle to the wavevector filter is greater than the critical angle $\theta_t$, an incident wave cannot pass through the wavevector filter, and each position of the wavevector filter is equivalent to an aperture stop.

2. The metasurface-based imaging system according to claim 1, wherein the imaging system satisfies conditions of $0.25f \leq D \leq 5f$, and $0.4f \leq TTL \leq 2f$, where $f$ is a focal length of the imaging system, D is the aperture stop diameter of the imaging system, and TTL is the optical total track length of the imaging system.

3. The metasurface-based imaging system according to claim 1, wherein the quadratic-phase-based monolayer metasurface structure comprises a unit structure array and a substrate, with the wavevector filter integrated onto a side of the substrate opposite the unit structure array.

4. The metasurface-based imaging system according to claim 3, wherein the unit structure array is composed of unit structures, and the unit structure is a sub-wavelength pillar with a horizontal section that is circular or a regular polygon; a period is p, and $0.1\lambda < p < \lambda$; a width is w, and $0.05p < w < p$; and a height is h, and $0.2\lambda < h < 3\lambda$, wherein when the horizontal section is circular, the width w is a diameter, and when the horizontal section is the regular polygon, the width w is a side length; $\lambda$ is the design wavelength of the imaging system; a material of the unit structure is silicon, titanium dioxide, or silicon nitride, and the unit structures are arranged in regular hexagon, square, or regular octagon on the substrate; and the substrate is made of sapphire or silicon dioxide.

5. The metasurface-based imaging system according to claim 1, wherein the wavevector filter is realized by a structure functioning as a narrowband filter, a shortpass filter, or a band-stop filter.

6. The metasurface-based imaging system according to claim 5, wherein the wavevector filter is an optical filter, an F-P cavity metasurface, or a metasurface with a filtering function.

7. A design method for a metasurface-based imaging system, applied to the metasurface-based imaging system according to claim 1, wherein the method comprises:
Step 1, determining a design wavelength $\lambda$ of the imaging system, and an aperture stop diameter D, and a focal length $f$ of the imaging system, and obtaining a phase distribution $\varphi(r)$ of a quadratic-phase-based metasurface structure according to a quadratic-phase distribution formula $\varphi(r) = -k_0 r^2 / 2f$, wherein r is a distance from different positions of the metasurface structure to a center of the metasurface structure, and $k_0=2\pi/\lambda$ is a wavevector of an incident light in free space; and proceeding to Step 2;

Step 2, selecting a material of the metasurface structure based on the phase distribution $\varphi(r)$ and the design wavelength of the imaging system, and using optical design software to design a geometric parameter and an arrangement of the unit structure of a corresponding metasurface structure; and proceeding to Step 3;

Step 3, making each position of the wavevector filter equivalent to an aperture stop; determining a value of a critical angle $\theta_t$ of the wavevector filter, wherein the value of $\theta_t$ determines an the diameter of the equivalent aperture stop, comprising:

step 1), pre-setting an initial value $\theta_{t0}$ of the critical angle, conducting imaging simulation, and comparing with an imaging system without a wavevector filter, wherein when a modulus of an optical transfer function of the imaging system designed with the critical angle $\theta_{t0}$ reaches 0.25, a corresponding spatial frequency increases, a selected detector can detect the corresponding spatial frequency at its cutoff frequency, and then the value of the critical angle $\theta_t$ is $\theta_{t0}$; and proceeding to Step 4, otherwise, proceeding to step 2); and step 2), fine-tuning $\theta_{t0}$ and repeating step 1); and Step 4, designing the wavevector filter based on the value of the critical angle $\theta_t$.

8. The design method of the metasurface-based imaging system according to claim 7, wherein a material of the metasurface structure comprises a material of the unit structure and a material of the substrate; and the material of the unit structure and the material of the substrate exhibit low loss for light waves at the design wavelength $\lambda$.

9. The design method of the metasurface-based imaging system according to claim 7, wherein the Step 4 of designing the wavevector filter based on the value of the critical angle $\theta_t$ comprises selecting any one of a narrowband filter, shortpass filter, or band-stop filter with the critical angle $\theta_t$.

10. A detector, wherein the detector comprises the imaging system according to claim 1.

* * * * *